United States Patent [19]

Quackenbush et al.

[11] Patent Number: 5,035,775

[45] Date of Patent: * Jul. 30, 1991

[54] ULTRAPURE HYDRAZINE PRODUCTION

[75] Inventors: Allen B. Quackenbush; James G. Rigsby, both of Lake Charles, La.

[73] Assignee: Olin Corporation, Cheshire, Conn.

[*] Notice: The portion of the term of this patent subsequent to Feb. 14, 2006 has been disclaimed.

[21] Appl. No.: 308,508

[22] Filed: Feb. 9, 1989

Related U.S. Application Data

[63] Continuation-in-part of Ser. No. 891,097, Jul. 31, 1986, Pat. No. 4,804,442.

[51] Int. Cl.⁵ .......................... B01D 3/10; B01D 3/34
[52] U.S. Cl. ........................................ 203/12; 203/37; 203/73; 423/407
[58] Field of Search ..................... 203/12, 36, 37, 91, 203/73; 159/47.1, DIG. 16; 202/205; 423/407

[56] References Cited

U.S. PATENT DOCUMENTS

| | | | |
|---|---|---|---|
| 2,690,378 | 9/1954 | Penneman | 423/407 |
| 2,698,286 | 12/1954 | Bircher, Jr. | 203/12 |
| 2,740,692 | 4/1956 | Ryker et al. | 423/407 |
| 2,774,725 | 12/1956 | Swenson et al. | 203/6 |
| 2,799,631 | 7/1957 | Von Hessert et al. | 203/37 |
| 2,803,524 | 8/1957 | Deutschman, Jr. et al. | 423/407 |
| 4,013,758 | 3/1977 | Osborg | 423/407 |

FOREIGN PATENT DOCUMENTS

| | | |
|---|---|---|
| 499033 | 5/1960 | Canada . |
| 620713 | 3/1949 | United Kingdom . |
| 695264 | 8/1953 | United Kingdom . |
| 713792 | 8/1954 | United Kingdom . |
| 782060 | 8/1957 | United Kingdom . |
| 890240 | 2/1962 | United Kingdom . |

OTHER PUBLICATIONS

Schmidt, E. W., "Hydrazine and Its Derivatives", New York, Wiley-Interscience, 1984, pp. 73-84

*Primary Examiner*—Virginia Manoharan
*Attorney, Agent, or Firm*—James B. Haglind; Paul Weinstein

[57] ABSTRACT

A process for producing hydrazine containing at least 98 percent by weight of $N_2H_4$ which admixes an aqueous solution of hydrazine with an alkali metal hydroxide to form a hydrazine solution having a $N_2H_4$ concentration of at least 70 percent by weight. The molar ratio of alkali metal hydroxide to water is less than about 0.5:1. The concentrated hydrazine solution is distilled in a fractional distillation apparatus at an overhead vapor temperature below about 50° C. and at a pressure of less than about 60 mm Hg.

8 Claims, No Drawings

ULTRAPURE HYDRAZINE PRODUCTION

This application is a continuation-in-part application of U.S. Ser. No. 891,097, filed July 31, 1986, now U.S. Pat. No. 4,804,442 issued Feb. 14, 1989.

The present invention is related to the purification of aqueous solutions of hydrazine. More particularly, the invention is related to the purification of aqueous solutions of hydrazine to produce anhydrous and ultra high purity hydrazine.

The use of anhydrous hydrazine in rocket propulsion has led to extensive investigations on methods for dehydration of the hydrazine solution produced by commercial processes. These efforts have been extensively reviewed by E. W. Schmidt on pages 73-84 of his publication "Hydrazine and Its Derivatives," New York, Wiley-Interscience, 1984.

The weak hydrazine solutions produced by commercial processes can be partially dehydrated by simple distillation wherein part of the water is removed therefrom to provide a constant boiling (at 118.5° C.) mixture or azeotrope of about 70 percent hydrazine and the balance water, i.e., 70.1 percent hydrazine and 29.9 percent water by weight. Additional water cannot be separated therefrom using the normal distillation procedures.

Aqueous solutions of hydrazine have been dehydrated using hygroscopic alkaline substances such as NaOH, BaO, KOH, etc. The employment of one method, e.g., treatment with NaOH, is described in U.S. Pat. No. 2,740,692, issued Apr. 3, 1956 to D. W. Ryker et al, and British Patent 713,792, published Aug. 18, 1954. In these processes, solid NaOH is added to a hydrazine solution in amounts sufficient to provide a molar ratio of NaOH to water of at least 1:1 and to form sodium monohydrate. Distillation of the mixture is carried out at pressures in the range of 90-150 mm Hg. During the distillation, a hydrazine-rich phase and a viscous lower aqueous phase are formed. While this process is suitable for producing ultrapure hydrazine, the distillation temperatures and corresponding pressures must be maintained above 60° C. to prevent a large portion of the sodium hydroxide monohydrate from solidifying. Further, as the concentration of hydrazine in the aqueous phase is reduced, higher temperatures are required to recover the remaining hydrazine. These operations are thus carried out under increased safety hazards.

Anhydrous hydrazine has been produced by treating hydrazine hydrate with a fluid ("entrainer") that forms an azeotrope with water that boils at a temperature different from that of hydrazine or hydrazine hydrate. "Entrainers" have suitably been organic compounds such as aniline, benzene, pyridine, xylene, toluene, propyl alcohols, n-hexyl alcohol, cresol, glycol, glycol ethers and hexylamine, with aniline being used most frequently.

While the use of entrainers can produce anhydrous hydrazine having 99 percent or higher of $N_2H_4$, the organic impurities remaining prevent or limit its use in particular applications such as its use as a mono-propellant in engines for spacecrafts. Thus various methods have been developed to prepare ultrapure hydrazine from anhydrous hydrazine. One method developed by the Martin-Marietta Corporation employs a fractionated freezing process. Anhydrous hydrazine is frozen slowly at a temperature of 262±1 K. (13±2° F.) to allow pure crystals to settle and the contaminants to accumulate in a supernatant fluid which is decanted. The pure hydrazine crystals are allowed to melt and are re-frozen. After three to four freeze-thaw cycles, the aniline content is reduced and the carbon content is lowered from approximately 7000 ppm to less than 20 ppm.

Ultrapure hydrazine can also be prepared by directional crystallization in which slow passage of the crystallization zone through a stirred sample in a large test tube takes place. The test tube is lowered into a cold bath at 223° K. Repetitive crystallization-separation-thaw cycles were able to produce hydrazine having a content up to 99.99 percent $N_2H_4$.

Other methods for producing low-impurity hydrazine include the use of ion exchange resins or absorbents such as activated alumina.

There is a need, however, for a process for producing ultrapure hydrazine directly from aqueous hydrazine solutions by a method which can be operated without requiring the use of entrainers, diluents, ion exchange resins, or other absorbents which introduce undesired impurities.

It is therefore a primary object of the present invention to provide a process for producing anhydrous and ultrapure hydrazine directly from aqueous hydrazine solutions.

A further object of the present invention is to provide a process which can be operated in the absence of entrainers, diluents, or absorbents for producing ultrapure hydrazine which can be used as a mono-propellant in spacecraft engines.

These and other objects of the invention are accomplished in a process for producing hydrazine containing at least 98 percent by weight of $N_2H_4$ which comprises admixing an aqueous solution of hydrazine with an alkali metal hydroxide to form a hydrazine solution having a $N_2H_4$ concentration of at least 70 percent by weight and a molar ratio of alkali metal hydroxide to water of less than about 0.5:1, and distilling the concentrated hydrazine solution at an overhead vapor temperature below about 50° C. and at a pressure of less than about 60 mm Hg.

The novel process of the present invention is adapted for use in purifying aqueous solutions having any suitable concentration of hydrazine and which are free, or contain low concentrations, of volatile carbonaceous materials as impurities. The term "volatile carbonaceous materials" as used herein refers to those carbonaceous impurities which would be carried over with the distillate. In accordance with the invention, where the $N_2H_4$ concentration is below about 70 percent, the solution is first concentrated by methods which avoid the use of carbon-containing materials. For example, the aqueous solution of hydrazine is dehydrated using as the dehydrating agent an alkali metal hydroxide. Suitable alkali metal hydroxides include sodium hydroxide, potassium hydroxide, and lithium hydroxide. The alkali metal hydroxide, preferably in solid form, is admixed with the aqueous hydrazine solution in amounts which are sufficient to remove water from the solution to provide an aqueous solution having a hydrazine concentration greater than about 70 percent by weight of $N_2H_4$. Suitable dehydrated hydrazine solutions contain from about 10 percent to about 30 percent of water by weight.

The amounts of alkali metal hydroxide added to the aqueous hydrazine solution are those which provide a molar ratio of alkali metal hydroxide to water of less than about 0.5:1. For example, suitable amounts provide a molar ratio of alkali metal hydroxide to water in the range of from about 0.15:1 to about 0.5:1, and preferably from about 0.25:1 to about 0.35:1. These amounts maintain the aqueous hydrazine solution in the liquid phase and at low viscosities during distillation and facilitate $N_2H_4$ removal while substantially preventing the chances for the solution "setting up" or freezing in the distillation apparatus. During operation of the novel process of the present invention, the aqueous liquid phase is free of solids and has a viscosity which is no higher than about 15 centipoises.

The aqueous hydrazine solution is then distilled under conditions which minimize the hazardous conditions which may be present when using processes of the prior art. The fractional distillation of the hydrazine-rich liquid phase is carried out at reduced overhead vapor pressures. These reduced pressures permit the fractionation to take place at low temperatures where hydrazine does not readily decompose in the absence of catalysts. Suitable overhead vapor pressures are those below about 60 millimeters, for example, in the range of from about 5 to about 55, preferably in the range of from about 10 to about 45, and more preferably in the range of from about 30 to about 40 millimeters of mercury. At these pressures the overhead vapor temperatures employed are below about 50° C. and the novel process thus eliminates or clearly minimizes the dangers of explosions which are present in the processes of the prior art as discussed, for example, in the E. W. Schmidt's publication cited above.

The overhead vapor temperatures corresponding to the reduced pressures discussed above are those in the range of from about 10° to about 50° C., preferably from about 20° to about 45° C., and more preferably from about 35° to about 45° C.

The distillation is preferably operated at initial hydrostatic heads which permit formation of a hydrazine-rich liquid phase. Higher recovery of $N_2H_4$ from the initial feed charge without increasing the overhead vapor temperature is accomplished. Preferably, the distillation process results in lowering the liquid temperature of the sump as fractionation progresses. Suitable initial head levels include those above about 4 feet (1.2 meters), and preferably at from about 11 to about 25 feet (ca 3.75 to ca 7.6 meters).

The novel process of the present invention produces anhydrous hydrazine having a $N_2H_4$ concentration of at least 98 percent by weight and low concentrations of volatile carbonaceous materials.

Further, the process of the present invention, by employing hydrazine solutions initially having very low concentrations of volatile carbonaceous materials, for example, those produced in the Raschig process, produces ultra high purity hydrazine having a concentration of at least 99.0 percent, preferably 99.7 percent, and more preferably 99.8 percent by weight of $N_2H_4$ and less about 10 parts per million of volatile carbonaceous materials.

In contrast to processes of the prior art, the novel process of the present invention allows neat hydrazine to be in contact with glass or metal surfaces without decomposing and accomplishes its production in the absence of diluents or additives.

In addition, the novel process of the present invention, minimizes the attack on or decomposition of packing materials in the distillation apparatus.

The invention is further illustrated by the following examples without any intention of being limited thereby. All parts and percentages are by weight unless otherwise specified.

EXAMPLE 1

A hydrazine solution (62.9 percent $N_2H_4$) was added to a three neck 3 liter boiling flask. Solid NaOH pellets were added to the hydrazine solution while stirring. After dissolution of the first batch of solid NaOH pellets, additional pellets were added in stages until the solution became saturated with NaOH at room temperature. An inclined condenser (cooled by a glycol solution at 10° C.) was attached to the middle neck of the flask and arranged so that the condensed liquid would drop into a 500 cc receiver. Vacuum was applied to the system via the product receiver and was maintained by use of a vacuum pump. The flask was slowly heated by a water bath to boil off the hydrazine contained in the flask. Several batches of hydrazine condensate (4997 grams) were collected in the receiver and by analysis averaged 90.4 percent $N_2H_4$. This hydrazine solution was added to a three neck, 12 liter boiling flask equipped with a stirring bar and a magnetic stirrer. The flask was placed in a warm water bath maintained between 30° and 40° C. An Oldershaw column having 20 trays was installed in the center neck. A vacuum distillation head that would allow variation of reflux to the column was installed at the top of the column. The vacuum was maintained at 6 mm. A reflux condenser was installed above the distilling head and was cooled by refrigerated glycol solution to maintain the temperature at 16°-19° C. The product analyzed by $KIO_3$ titration was 99.78 percent by weight of $N_2H_4$. By gas chromatographic (G. C.) analysis the $N_2H_4$ concentration of the solution was 99.9 percent. The G. C. Analysis using a flame ionization detection system did not detect any organic substances in the sample.

EXAMPLE 2

A hydrazine solution containing 64.4 parts hydrazine and 35.6 parts water was mixed with 22.4 parts commercial flaked caustic. The resulting solution containing 71.6 percent $N_2H_4$ was charged into a distillation apparatus. The solution filled the bottom 14.2 feet of the distillation sump. The upper portion of the apparatus contained a high efficiency packing for low pressure rectification. Vacuum was applied to the aparatus with a vacuum pump to reduce the overhead vapor pressure to 32 mm Hg. Steam was used to heat the liquid in the sump via a heat exchanger. Because of the hydrostatic head, the solution temperature in the lower portion of the liquid climbed to 85° C. Hydrazine was condensed overhead by an internal condenser and collected into a product receiver. The overhead collection temperature was 41° C. As product was collected overhead, the liquid level in the sump of the column dropped from 14.2 feet to 7.2 feet. As the level dropped, the temperature at the bottom of the liquid decreased to 72° C. The batch was distilled until a sharp temperature increase in the overhead vapor temperature indicated an increase in water concentration. With the above charge, 42.9 parts of hydrazine at 99.8 percent purity was collected in the product receiver. Less than 10 parts per million of volatile carbonaceous material were found in the product.

EXAMPLE 3

The apparatus was operated with the same charge composition and overhead vapor pressure and temperature conditions employed in Example 1. The column sump was charged to a level of 7.8 feet. The solution temperature started at 46° C. When a sharp increase in water content was detected by temperature change in the overhead vapor the operation halted. The final bottom liquid level was 6.0 feed and the final solution temperature was 52° C. There were 18.8 parts of hydrazine collected in the product receiver with a concentration of 99.9 percent $N_2H_4$. Less than 10 parts per million of volatile carbonaceous material were found in the product.

What is claimed is:

1. A process for producing hydrazine which comprises admixing an aqueous solution of hydrazine with an alkali metal hydroxide to form a hydrazine solution having a $N_2H_4$ concentration of at least 70 percent by weight and a molar ratio of alkali metal hydroxide to water of about 0:15:1 to about 0:5:1, and distilling the hydrazine solution at overhead vapor temperatures of from about 10° to about 50° C., at overhead vapor pressures below about 60 millimeters of mercury and an initial hydrostatic head of above about 4 feet such that a hydrazine containing at least 98 percent by weight of $N_2H_4$ is obtained.

2. The process of claim 1 in which the overhead vapor pressure is in the range of from about 10 to about 45 mm Hg.

3. The process of claim 2 in which the molar ratio of alkali metal hydroxide to water is from about 0.25:1 to about 0:35:1.

4. The process of claim 3 in which the overhead vapor temperature is from about 20° to about 45° C.

5. The process of claim 4 in which the initial hydrostatic head is from about 11 to ab out 25 feet.

6. A process for producing hydrazine which comprises admixing an aqueous solution of hydrazine with an alkali metal hydroxide to form a hydrazine solution having a $N_2H_4$ concentration of at least 70 percent by weight and a molar ratio of alkali metal hydroxide to water of less than about 0.5:1, and distilling the concentrated hydrazine solution at an overhead vapor temperature below about 50° C., at an overhead vapor pressure of less than about 60 mm Hg., and a viscosity in the liquid phase of no higher than about 15 centipoises such that a hydrazine containing at least 98 percent by weight of $N_2H_4$ is obtained.

7. The process of claim 6 in which the overhead vapor pressure is from about 5 to about 55 millimeters of Hg.

8. The process of claim 6 in which the alkali metal hydroxide is sodium hydroxide.

* * * * *